(12) United States Patent
Hirose

(10) Patent No.: US 8,997,211 B2
(45) Date of Patent: Mar. 31, 2015

(54) DISPLAY APPARATUS, AUTHENTICATION METHOD, AND PROGRAM

(75) Inventor: Hiroaki Hirose, Nagano (JP)

(73) Assignee: Japan Display West Inc., Aich-Ken (JP)

( * ) Notice: Subject to any disclaimer, the term of this patent is extended or adjusted under 35 U.S.C. 154(b) by 66 days.

(21) Appl. No.: 13/072,274

(22) Filed: Mar. 25, 2011

(65) Prior Publication Data

US 2011/0247067 A1    Oct. 6, 2011

(30) Foreign Application Priority Data

Apr. 2, 2010 (JP) ................. 2010-085808

(51) Int. Cl.
*G06F 7/04* (2006.01)
*G06F 3/0488* (2013.01)
*G06F 21/36* (2013.01)
*G06F 21/62* (2013.01)

(52) U.S. Cl.
CPC .............. *G06F 3/0488* (2013.01); *G06F 21/36* (2013.01); *G06F 21/629* (2013.01); *G06F 2221/2113* (2013.01)
USPC .......................................................... 726/19

(58) Field of Classification Search
CPC ............................... G06F 21/575; G06F 21/31
USPC .......................................................... 726/19
See application file for complete search history.

(56) References Cited

U.S. PATENT DOCUMENTS

| | | | |
|---|---|---|---|
| 2007/0024594 A1* | 2/2007 | Sakata et al. ................. | 345/173 |
| 2007/0150842 A1 | 6/2007 | Chaudhri et al. | |
| 2009/0199295 A1 | 8/2009 | Shih et al. | |
| 2009/0241072 A1 | 9/2009 | Chaudhri et al. | |
| 2010/0321304 A1* | 12/2010 | Rofougaran ................. | 345/173 |
| 2011/0296356 A1 | 12/2011 | Chaudhri et al. | |
| 2012/0023458 A1 | 1/2012 | Chaudhri et al. | |
| 2012/0293438 A1 | 11/2012 | Chaudhri et al. | |
| 2013/0185677 A1 | 7/2013 | Chaudhri et al. | |

(Continued)

FOREIGN PATENT DOCUMENTS

| | | |
|---|---|---|
| CN | 101371258 | 2/2009 |
| CN | 101499905 | 8/2009 |

(Continued)

OTHER PUBLICATIONS

Japanese Office Action issued Dec. 24, 2013 for Japanese Appln. No. 2010-085808.

(Continued)

*Primary Examiner* — Anthony Brown
(74) *Attorney, Agent, or Firm* — K&L Gates LLP

(57) ABSTRACT

A display apparatus includes an input section that inputs input information representing an input operation from an operation means contacting a touch screen, a display section that refers to an authentication table correlating the input operation with a display image so as to display the display image on the touch screen, and an authentication processing section that refers to the authentication table so as to determine whether or not a combination of a display image displayed on the touch screen and an input operation represented by the input information input by the input section in a state where the display image is being displayed is correlated in the authentication table, and authenticates an input action by the input operation when the combination is correlated in the authentication table.

4 Claims, 7 Drawing Sheets

(56) References Cited

U.S. PATENT DOCUMENTS

| | | |
|---|---|---|
| 2013/0185678 A1 | 7/2013 | Chaudhri et al. |
| 2013/0185680 A1 | 7/2013 | Chaudhri et al. |
| 2013/0190056 A1 | 7/2013 | Chaudhri et al. |

FOREIGN PATENT DOCUMENTS

| | | |
|---|---|---|
| JP | 07-287634 | 10/1995 |
| JP | 10-289210 | 10/1998 |
| JP | 2006-331210 | 12/2006 |
| JP | 2008-257427 | 10/2008 |
| JP | 2009-521753 | 6/2009 |

OTHER PUBLICATIONS

Chinese Office Action issued Dec. 3, 2014, for corresponding Chinese Appln. No. 2011100732947.

* cited by examiner

FIG.3

AUTHENTICATION TABLE (23)

| SECURITY LEVEL | DISPLAY IMAGE | INPUT OPERATION | | |
|---|---|---|---|---|
| | | GESTURE | CONTACT AREA | CONTACT POSITION |
| A | あ | MOVE RIGHT | — | — |
| A | い | ROTATE LEFT | — | — |
| A | う | REDUCE | — | — |
| B | か | MOVE RIGHT | 1 cm² OR MORE | — |
| B | き | ROTATE LEFT | 1 cm² OR MORE | — |
| C | さ | MOVE RIGHT | 1 cm² OR MORE | AREA W |
| C | し | ROTATE LEFT | 1 cm² OR MORE | AREA W |

<MOVE RIGHT>

<REDUCE>

<ROTATE LEFT>

<MOVE TO THE BOTTOM AND STOP AT THE CENTER>

<ZIGZAG>

SECURITY LEVEL: A (LOW)

OPERATION INPUT:
GESTURE (MOVE RIGHT)

SECURITY LEVEL: B (MEDIUM)

OPERATION INPUT { GESTURE (MOVE RIGHT) CONTACT AREA (1 cm² OR MORE) }

AREA W

SECURITY LEVEL: C (HIGH)

OPERATION INPUT { GESTURE (MOVE RIGHT) CONTACT AREA (1 cm² OR MORE) CONTACT POSITION (AREA W) }

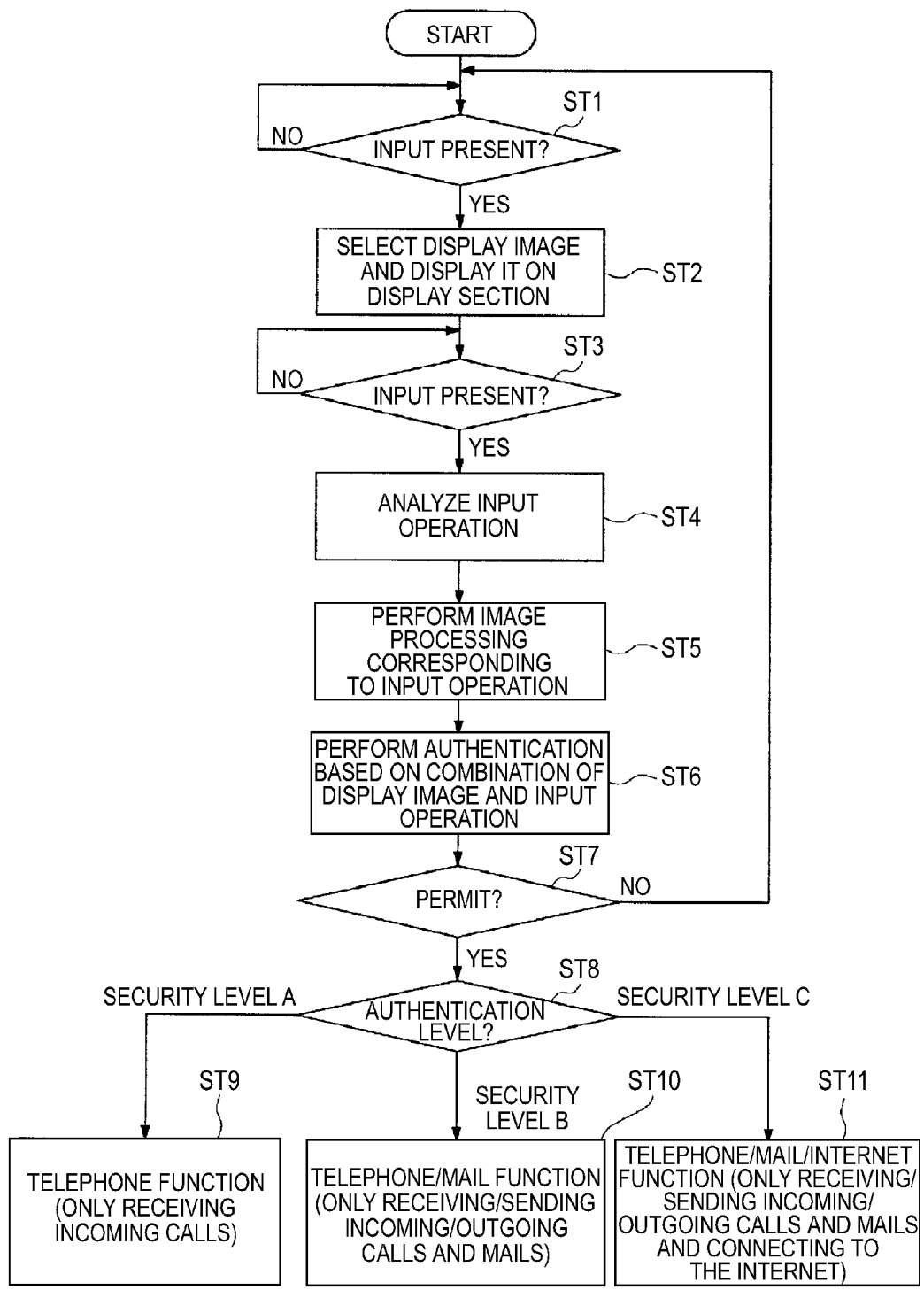

DISPLAY APPARATUS, AUTHENTICATION METHOD, AND PROGRAM

CROSS REFERENCES TO RELATED APPLICATIONS

The present application claims priority to Japanese Patent Application JP 2010-085808 filed on Apr. 2, 2010, the entire contents of which is hereby incorporated by reference.

BACKGROUND

The present disclosure relates to a display apparatus having a display section such as a touch panel and an input section, an authentication method, and a program.

There is, for example, an electronic apparatus in which authentication is permitted when a figure hand-written on a touch panel by a finger of a user is identical to a figure registered in advance (for example, see JP-A-2008-257427).

SUMMARY

However, the electronic apparatus such as disclosed in JP-A-2008-257427 has a problem in that when a simple figure is registered as an authentication figure, the determination level of authentication is not high enough to prevent authentication errors, whereby sufficient security is not secured, and malfunctions may occur.

On the other hand, when a complex figure is registered as the authentication figure, the determination level of authentication is so strict that even an input by a true user who is to be authenticated is not authenticated. In particular, if a user is weak at drawing or is not good at operating a touch panel, the user has to perform an authentication operation continuously until the user draws a figure identical to a registered figure, which deteriorates operability.

Therefore, it is desirable to provide a display apparatus, an authentication method, and a program capable of performing authentication in accordance with a user, thus improving the user's operability.

According to an embodiment, there is provided a display apparatus including: an input section that inputs input information representing an input operation from an operation means contacting a touch screen; a display section that refers to an authentication table correlating the input operation with a display image so as to display the display image on the touch screen; and an authentication processing section that refers to the authentication table so as to determine whether or not a combination of a display image displayed on the touch screen and an input operation represented by the input information input by the input section in a state where the display image is being displayed is correlated in the authentication table, and authenticates an input action by the input operation when the combination is correlated in the authentication table.

The display apparatus according to the embodiment may further include an image processing section that performs image processing representing the input operation on the display image displayed on the touch screen.

In the display apparatus according to the embodiment, the authentication table may include at least one of a movement of the operation means on the touch screen, a contact area of the operation means on the touch screen, and a contact position of the operation means on the touch screen as the input operation.

In the display apparatus according to the embodiment, the authentication table may further correlate a security level representing the difficulty of permitting authentication with the display screen and the input operation which are correlated with each other.

In the display apparatus according to the embodiment, the authentication table may correlate the input operation having a weak correlation to the content of the display image.

According to another embodiment, there is provided an authentication method including the steps of: referring to an authentication table that correlates a display image with an input operation so as to display the display image on a touch screen; inputting input information representing an input operation from an operation means contacting the touch screen; and referring to the authentication table so as to determine whether or not a combination of a display image displayed on the touch screen and an input operation represented by the input information input by the input section in a state where the display image is being displayed is correlated in the authentication table, and authenticating an input action by the input operation when the combination is correlated in the authentication table.

According to still another embodiment, there is provided a program for causing a computer to execute the steps of: referring to an authentication table that correlates a display image with an input operation so as to display the display image on a touch screen; inputting input information representing an input operation from an operation means contacting the touch screen; and referring to the authentication table so as to determine whether or not a combination of a display image displayed on the touch screen and an input operation represented by the input information input by the input section in a state where the display image is being displayed is correlated in the authentication table, and authenticating an input action by the input operation when the combination is correlated in the authentication table.

Additional features and advantages are described herein, and will be apparent from the following Detailed Description and the figures.

BRIEF DESCRIPTION OF THE FIGURES

FIG. 3 is a diagram showing an example of an authentication table of the display apparatus according to the embodiment.

FIG. 7 is a flowchart illustrating an example of an authentication method according to an embodiment.

DETAILED DESCRIPTION

Hereinafter, embodiments will be described with reference to the drawings.

Figure 1:
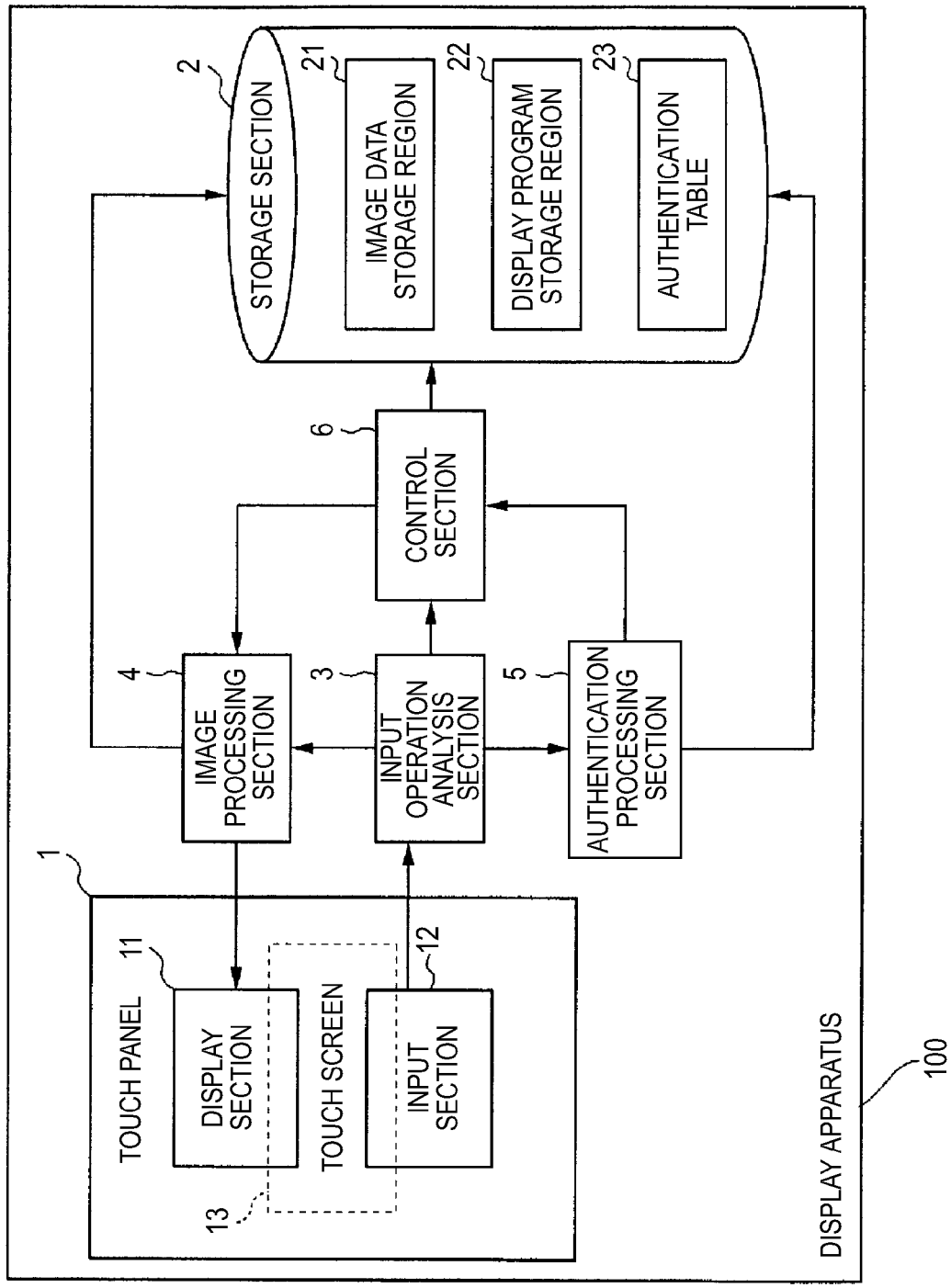
FIG. 1 is a block diagram showing an example of a display apparatus according to an embodiment.

FIG. 1 is a block diagram showing an example of a display apparatus according to an embodiment.

As shown in FIG. 1, the display apparatus according to the embodiment includes a touch panel 1, a storage section 2, an input operation analysis section 3, an image processing section 4, an authentication processing section 5, and a control section 6.

The touch panel 1 includes a display section 11 that includes a liquid crystal panel, for example, and an input section 12 that includes a touch pad, for example. The touch panel 1 is a display screen of the liquid crystal panel of the display section 11 and includes a touch screen 13 which is a sensor portion of the touch pad of the input section 12.

Figure 2:
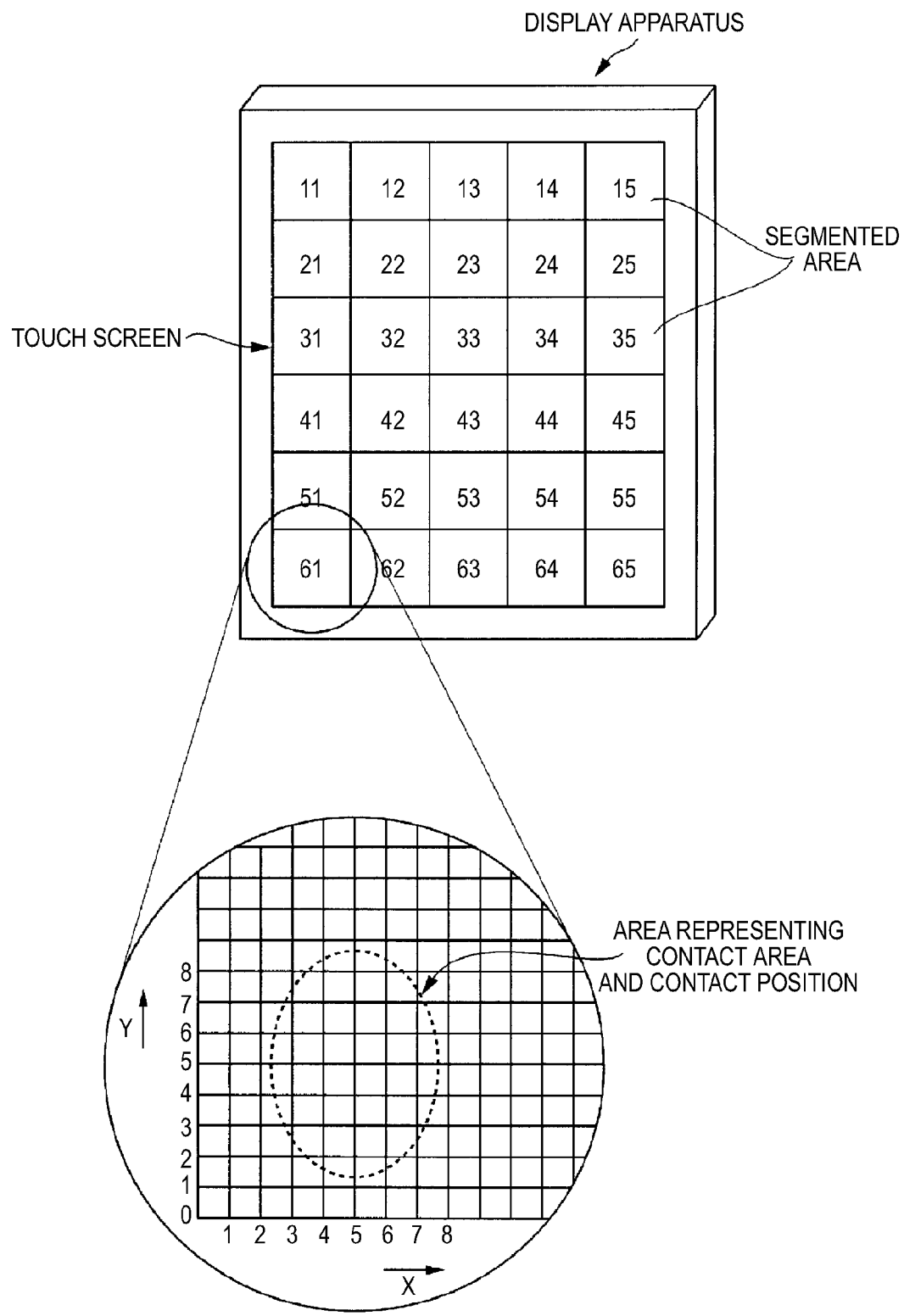
FIG. 2 is a schematic diagram showing an example of a touch screen of the display apparatus according to the embodiment.

The touch screen 13 is made up of a plurality of segmented areas 11, 12, 13, . . . , and 65 as shown in FIG. 2, for example. On the touch screen 13, matrix coordinates are defined so as to further segment the inner space of each segmented area.

The segmented areas and coordinates represent a contact position which is the point at which the finger of a user contacts on the touch screen 13 and also represent a contact area which is a collection of the points.

The display section 11 displays an image based on image data output from the image processing section 4 on the touch screen 13.

The input section 12 receives an input operation from an operation means contacting the touch screen 13 and outputs input information corresponding to the input operation to the input operation analysis section 3. The input section 12 outputs various kinds of information to the input operation analysis section 3 based on the received input operation. The information includes input information representing the trace of the movement of the operation means on the touch screen 13, input information representing the contact area of the operation means on the touch screen 13, and input information representing the contact position of the operation means on the touch screen 13.

As the operation means, the finger of the user, a special-purpose touch pen, and the like can be used. In this example, the operation means will be described to be the finger of the user.

The storage section 2 stores an image data storage region 21, a display program storage region 22, and an authentication table 23.

The image data storage region 21 is a region in which image data such as an authentication display image displayed on the display section 11 or an image representing an operation screen are stored.

The display program storage region 22 is a program for causing the control section 6 to execute processing for displaying an image corresponding to the input operation of the input section 12 on the display section 11, processing for displaying a specific image on the display section 11, processing for executing a telephone or mail function or an Internet connection function in accordance with the input from the input section 12.

The authentication table 23 is a table that correlates an input operation with an authentication display image. The authentication table 23 may use a table as shown in FIG. 3, for example.

As shown in FIG. 3, the authentication table 23 is a table that correlates the authentication display image and the input operation with a security level.

The security level is a level that represents the difficulty of permitting authentication. Here, a security level A has the lowest difficulty, and a security level C has the highest difficulty. Moreover, a security level B has an authentication difficulty that is approximately between the security levels A and C. The higher the authentication difficulty, the higher the importance of the function that can be used in the authenticated state. For example, the use of a function that uses personal information or important information can be permitted. Moreover, the lower the authentication difficulty, the lower is the importance of a function that can be used in the authenticated state. For example, the use of a function that is frequently used or a function that has a relatively low importance can be permitted.

For example, the security level A permits the execution of a telephone function (only a function of receiving incoming calls). The security level B permits the execution of a telephone/mail function (only the functions of receiving/sending incoming/outgoing calls and the function of sending/receiving mails). The security level C permits the execution of a telephone/mail/Internet function (only the functions of receiving/sending incoming/outgoing calls, the function of sending/receiving mails, and an Internet connection function).

The display image is an image or a picture including a character or a figure, and for example, may be the Japanese Hiragana alphabet "あ, い, う, . . . ". For example, an identifier of image data is correlated with the display image, and the image data itself is stored in the image data storage region 21.

The input operation is an input operation which is registered in advance as a combination with a display image that is authenticated and which is registered so as to correspond to the display image. The input operation is expressed, for example, by a gesture which represents the trace of the movement of the operation means on the touch screen 13, the contact area of the operation means on the touch screen 13, and the contact position of the operation means on the touch screen 13.

The combination of the security level, display image, and input operation included in the authentication table 23 is determined in advance, for example, and the combination is secretly notified only to a user who is authenticated. The combination may be notified through the Internet and may be delivered by a mailing means such as an envelope as long as it is notified in a state where the security thereof is maintained.

The combination of the security level, display image, and input operation included in the authentication table 23 may be created by a registration section (not shown) that stores a security level, a display image, and an input operation input from the input section 12 by a user in the authentication table 23 in a correlated manner.

The input operation which is correlated with the display screen in the authentication table 23 is preferably an input operation having a weak correlation to the content of the display image so that a user may not easily recall the input operation upon looking at the display image. With such an authentication condition, it is possible to improve reliability of authentication.

The input operation analysis section 3 analyzes the content of the received input operation based on the input information input from the input section 12. For example, the input operation analysis section 3 analyzes the trace of the movement of the user's finger based on the input information from the input section 12 and outputs the analysis result to the authentication processing section 5 as a gesture represented by the input operation.

The gesture represents the movement of a finger as shown in FIGS. 4A to 4E, for example. This example shows gestures which are relatively easy to make.

Figure 4A:
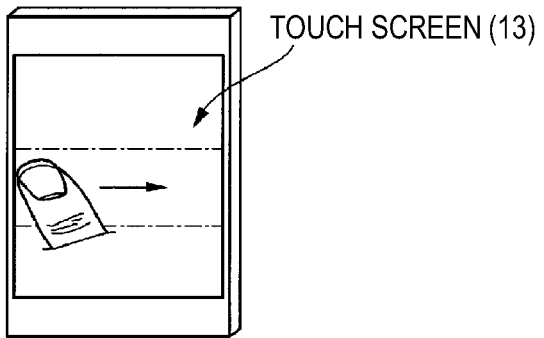
FIGS. 4A to 4E are diagrams illustrating gestures on the display apparatus according to the embodiment.
Figure 4B:
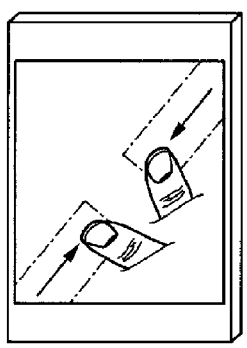
Figure 4C:
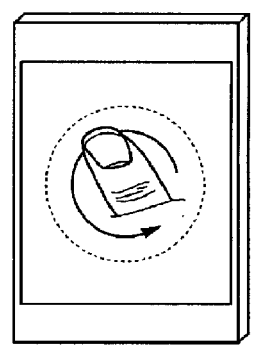
Figure 4D:
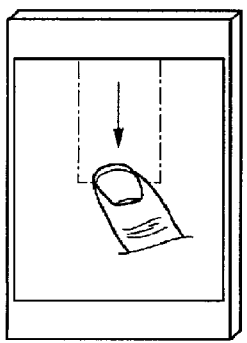
Figure 4E:
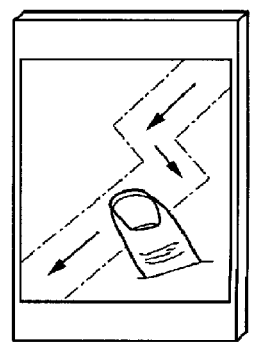

FIG. 4A shows a gesture of moving one finger to the right. FIG. 4B shows a gesture of moving two fingers from the outer side to the inner side. FIG. 4C shows a gesture of rotating one finger to the left. FIG. 4D shows a gesture of moving one finger from top to bottom, in which the beginning point is the uppermost portion of the touch screen 13 and the ending point is the center of the touch screen 13. FIG. 4E shows a gesture that moves one finger in a zigzag pattern from top-right to bottom-left.

Moreover, the input operation analysis section 3 analyzes the contact area in which the user's finger contacts the touch screen and the contact position on which the user's finger contacts based on the input information from the input section 12 and outputs the analysis result to the authentication processing section 5 as the contact area and the contact position represented by the input operation.

Figure 5A:
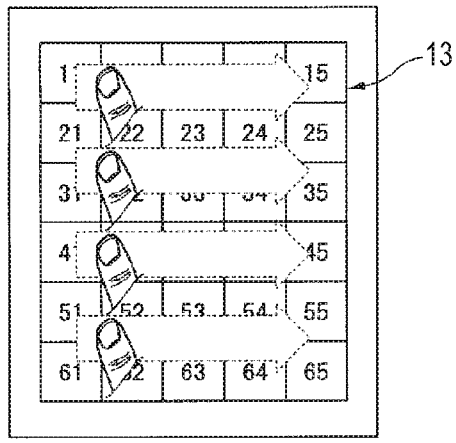
FIGS. 5A to 5C are diagrams illustrating examples of a security level and an operation input on the display apparatus according to the embodiment.
Figure 5B:
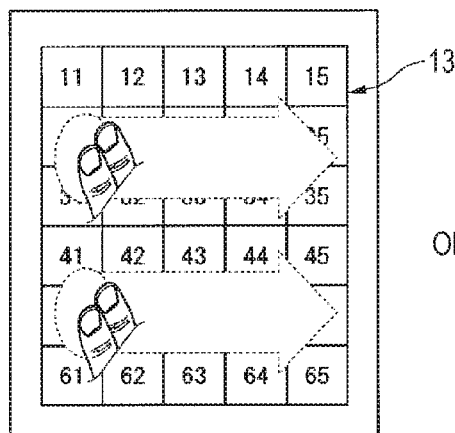
Figure 5C:
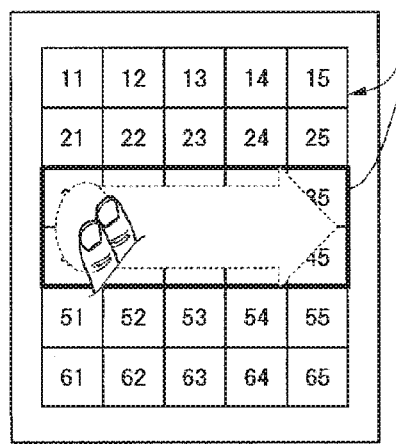

The relation between the security level and the input operation which is correlated in the authentication table 23 will be described with reference to FIGS. 5A to 5C. FIGS. 5A to 5C are diagrams illustrating examples of the security level and input operation which are correlated in the authentication table 23.

FIG. 5A illustrates an example in which a gesture "move right" which represents an operation input is correlated with the security level A. In this case, since only the gesture is included in the condition of the input operation, the position where the user moves the finger to the right may be any position on the touch screen 13 as shown in the drawing. Moreover, since the contact area is not included in the condition, the number of fingers moved to the right may be one or may be plural.

FIG. 5B illustrates an example in which a gesture "move right" and a contact area of "1 $cm^2$ or more," which represents an operation input, are correlated with the security level B. In this case, since the gesture and the contact area are included in the condition of the input operation, the finger moved to the right has to make contact with the touch screen 13 on a contact area of 1 $cm^2$ or more as shown in the drawing. For example, the user has to move at least two fingers to the right. Moreover, since the contact position is not included in the condition, the position where the user moves the finger to the right may be any position on the touch screen 13.

FIG. 5C illustrates an example in which a gesture "move right," a contact area of "1 $cm^2$ or more," and a contact position of "area W," which represents an operation input, are correlated with the security level C. Here, the area W is a region that includes the segmented areas 31 to 35 and 41 to 45. In this case, since the gesture, the contact area, and the contact position are included in the condition of the input operation, the finger moved to the right has to make contact with the touch screen 13 on a contact area of 1 $cm^2$ or more, and the position where the user moves the finger to the right has to be within the area W of the touch screen 13 as shown in the drawing.

As described above, by adding the condition such as the contact area and the contact position to the same gesture, it is possible to change the determination level of authentication. That is, the user can perform authentication with a simple gesture, and the reliability of authentication can be improved by determining the condition of the input operation in a more sensitive manner.

The image processing section 4 performs image processing corresponding to the input operation on the image data that is actually displayed on the display section 11 based on the input operation analyzed by the input operation analysis section 3 and outputs the processed image data to the display section 11. For example, the image processing section 4 creates successive image data so that the display image being actually displayed on the display section 11 when the an input operation is input appears to be moved within the touch screen 13 in accordance with a gesture represented by the input operation and outputs the created image data to the display section 11.

Figure 6A:
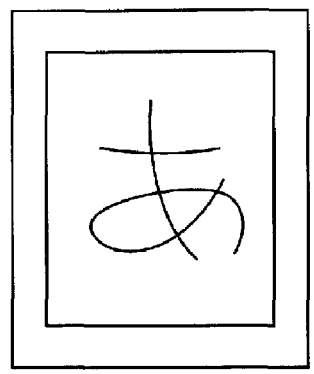
FIGS. 6A to 6C are diagrams showing examples of a screen changing in accordance with an input operation on the display apparatus according to the embodiment.
Figure 6B:
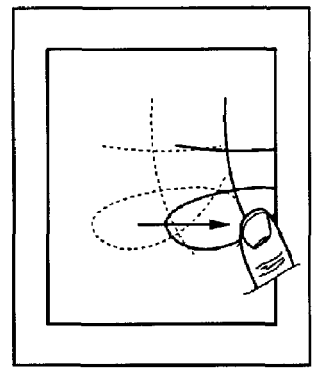

For example, as shown in FIG. 6A, when a gesture "move right" is input in a state where a display image representing the Japanese Hiragana alphabet "あ" is displayed on the display section 11, the display image is moved as shown in FIG. 6B. That is, the image processing section 4 creates successive image data so that the Japanese Hiragana alphabet "あ" appears to be moved to the right in accordance with the input operation and outputs the created image data to the display section 11.

Figure 6C:
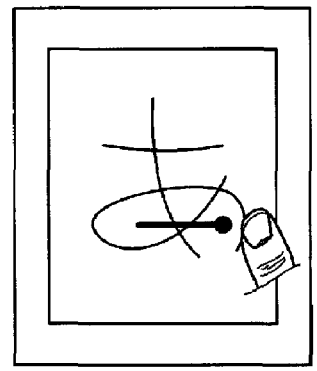

The image processing section 4 is not limited to this, and as shown in FIG. 6C, the Japanese Hiragana alphabet "あ" which is the display image actually being displayed on the display section 11 when the input operation is input may not be moved and an icon representing the contact portion of the finger may be displayed. That is, when a gesture "move right" is input, the image processing section 4 may create successive image data so that the icon appears to be moved to the right in accordance with the gesture represented by the input operation.

The authentication processing section 5 refers to the authentication table 23 of the storage section 4 to determine whether or not a combination of the input operation output from the input operation analysis section 3 and the display image displayed on the display section 11 by the image processing section 4 is correlated in the authentication table 23. When it is determined that the combination of the input operation and the display image is correlated in the authentication table 23, the authentication processing section 5 permits authentication by the input operation.

When authentication is permitted, the authentication processing section 5 allows the control section 6 to execute a function corresponding to any one of the security levels A to C to which the input operation and the display image are correlated.

Next, an example of an authentication method according to an embodiment will be described with reference to FIG. 7.

As shown in FIG. 7, the control section 6 of the touch panel 1 determines whether or not there is an input from the input section 12 (step ST1).

For example, when the user touches lightly on the touch screen 13 with a finger, the input section 12 receives an input and outputs input information to the input operation analysis section 3. The input operation analysis section 3 analyzes the input operation based on the input information and outputs the analysis result to the control section 6. The control section 6 starts authentication processing corresponding to the input operation represented by the analysis result of the input operation analysis section 3 in accordance with the display program storage region 22 of the storage section 2.

The control section 6 selects image data of the display image correlated with the authentication table 23, reads out the image data from the image data storage region 21, and outputs the image data to the image processing section 4. The image processing section 4 displays an image based on the received image data on the display section 11 (step ST2). Here, the control section 6 selects a display image "あ", for example and correlates a flag with the display image "あ".

When the authentication display image is set so as to be displayed in a random manner, for example, the control section 6 selects an arbitrary display image among the display images correlated in the authentication table 23. On the other hand, when the authentication display image is set so as to be displayed for each security level, the control section 6 selects a display image corresponding to a security level determined in advance from the authentication table 23. For example, when the input in step ST1 is a single touch, the control section 6 is configured to select a display image corresponding to the security level A. Moreover, when the input in step ST1 is two successive touches, the control section 6 is configured to select a display image corresponding to the security level B.

Subsequently, the control section 6 of the touch panel 1 determines whether there is an input from the input section 12 (step ST3). When there is an input, the input section 12 outputs input information representing the received input operation to the input operation analysis section 3. Then, the input operation analysis section 3 analyzes the input operation based on the input information (step ST4). The input operation analysis section 3 outputs the analysis result to the image processing section 4 and the authentication processing section 5.

Here, as shown in FIG. 6A, it is assumed that a display image "あ" is displayed on the touch screen 31 of the touch panel 1, and the user moves the touch screen 12 to the right with one finger. In this case, the input operation analysis section 3 analyzes the input operation and obtains an input operation, for example, representing a gesture "move right", a contact area corresponding to one finger, and a contact position of the segmented areas 41 to 45 as the analysis result.

The image processing section 4 creates successive image data so that the Japanese Hiragana alphabet "あ" appears to be moved to the right as shown in FIG. 6B, for example, in accordance with the input operation and outputs the created image data to the display section 11 (step ST5). In this way, an image in which the Japanese Hiragana alphabet "あ" appears to be moved to the right is displayed on the display section 11.

On the other hand, the authentication processing section 5 refers to the authentication table 23 of the storage section 4 to determine whether or not a combination of the input operation input from the input operation analysis section 3 and the display image displayed on the display section 11 by the image processing section 4 is correlated in the authentication table 23 (step ST6).

Here, the display image "あ" displayed on the display section 11 is correlated with the gesture "move right" as the input operation in the authentication table 23. As described above, since the input operation output from the input operation analysis section 3 represents the gesture "move right", the authentication processing section 5 determines that the combination of the gesture "move right" as the input operation and the display image "あ" is correlated in the authentication table 23 and permits authentication (step ST7: Yes).

Moreover, the authentication processing section 5 determines that a security level correlated with the combination of the gesture "move right" as the input operation and the display image "あ" is the security level A (step ST8). The authentication processing section 5 instructs the control section 6 to release the execution of a function corresponding to the security level A (step ST9). In this way, the control section 6 executes only the function released by the authentication processing section 5 in accordance with the display program storage region 22. That is, the control section 6 is not allowed to execute the functions which are not released.

On the other hand, when the display image selected in step ST2 is a display image "か", the authentication processing section 5 performs authentication based on a gesture and a contact area representing the input operation obtained by the input operation analysis section 3 in step ST6. That is, the authentication processing section 5 refers to the authentication table 23 to determine whether or not the gesture representing the input operation obtained by the input operation analysis section 3 is "move right" and the contact area is 1 cm$^2$ or more. When the gesture representing the input operation is "move right" and the contact area is 1 cm$^2$ or more, the authentication processing section 5 permits authentication of the security level B and instructs the control section 6 to release the execution of a function corresponding to the security level B (step ST10).

Moreover, when the display image selected in step ST2 is a display image "さ", the authentication processing section 5 performs authentication based on a gesture, a contact area and a contact position representing the input operation obtained by the input operation analysis section 3 in step ST6. That is, the authentication processing section 5 refers to the authentication table 23 to determine whether or not the gesture representing the input operation obtained by the input operation analysis section 3 is "move right", the contact area is 1 cm$^2$ or more, and the contact position is the area W (the segmented areas 31 to 35 and 41 to 45). When the gesture representing the input operation is "move right", the contact area is 1 cm$^2$ or more, and the contact position is within the area W, the authentication processing section 5 permits authentication of the security level C and instructs the control section 6 to release the execution of a function corresponding to the security level C (step ST11).

As described above, the display apparatus 100 according to the embodiment determines whether or not a combination of the display image displayed on the display section 11 and the input operation input from the input section 12 is identical to the combination that is registered in advance in the authentication table 23, and permits authentication when the two combinations are identical.

Therefore, a user who does not know the input operation corresponding to the display image is unable to obtain permission for authentication. Therefore, even when a simple input operation corresponding to a user is used as an input operation for authentication, it is possible to secure a determination level of authentication. In this way, it is possible to prevent a decrease of authentication reliability due to authentication errors and the occurrence of malfunctions. By correlating an input operation with a display image such that a user may not easily recall the input operation from the display image, it is possible to further increase the reliability of authentication.

Moreover, as described above, the condition of the input operation for permitting authentication may be made stricter in accordance with the security level so that authentication is not permitted unless the corresponding condition of the registered gesture, contact area, or contact position is satisfied. In this way, by making the determination level of authentication stricter, it is possible to increase the reliability of authentication.

Therefore, the operability of the input operation can be changed in accordance with the security level so that authentication for a low security level is permitted through a simple gesture or the like whereas authentication for a high security level is permitted through a complex gesture or the like. In this way, it is possible to set the input operation corresponding to the user in accordance with the security level and to maintain the reliability of authentication and improve the operability of the user.

Furthermore, by changing the security level in accordance with the condition of the registered input operation, even when one display apparatus 100 is used by a plurality of persons, it is possible to restrict the functions in accordance with the respective persons. For example, when one display apparatus 100 is used by a family, and it is desired to allow a child to use only the call receiving function of a telephone, the child can be taught only the combination of the input operation and display image corresponding to the security level A for the child. By doing so, the child is unable to release the authentication of the security levels B and C and is only able to use the call receiving function of the telephone.

Moreover, it is preferable to correlate combinations of a plurality of display images and input operations with the same security level. By doing so, it is possible to provide the authentication condition for the same security level to a plurality of persons.

Furthermore, the display apparatus 100 according to the embodiment processes the display image displayed on the display section 11 in accordance with the input operation. That is, the display apparatus 100 performs image processing so that the display image displayed on the display section 11 appears to be moved within the touch screen 13 in accordance with the input operation or displays an icon that moves in accordance with the input operation on the display image.

In this way, by visually showing the input operation of the user, the user can see the input operation as the user inputs.

The present invention is not limited to the configuration described above but may have a configuration described below.

For example, a configuration in which upon receiving the input operation instructing to start authentication processing, the control section 6 displays a display image which is correlated with the input operation in the authentication table 23 on the display section 11 has been described. However, the present invention is not limited to this, and the control section 6 may read out image data of a display image which is correlated with the input operation in the authentication table 23 from the image data storage region 21 and display the readout image data on the display section 11. In this way, a dummy display image is displayed on the display section 11. In this case, even when a third party who does not know an input operation for authentication inputs an operation with respect to such a dummy display image, authentication is not permitted.

Moreover, the display image and input operation which are correlated in the authentication table 23 are not limited to the example above, and arbitrary images and operations can be used.

For example, a Japanese alphabet "い" may be input as a gesture of an input operation which is correlated to a display image "あ".

Moreover, in the embodiment, although the function that is released through authentication is described to be the telephone and mail functions and the like as an example, the authentication may release other functions, for example, such as games, playback and recording of audios, operations, and still images.

Furthermore, the control section 6 may allow the storage section 2 to store a combination of a display image and an input operation which are permitted in previous authentication so that the combination of the display image and input operation which were used previously is not permitted in subsequent authentication. By doing so, it is possible to prevent a user B who is peeking at the authentication operation of a user A from imitating the authentication of the user A by using the fact that authentication is permitted by the input operation of the user A, thus obtaining permission for authentication with the same combination of the display image and the input operation as those used by the user A. In this way, it is possible to improve the reliability of authentication.

Moreover, the authentication processing section 5 may be configured such that when authentication fails for a predetermined number of times or more, authentication processing is not performed any more. By doing so, it is possible to prevent a user who does not know a combination of the display image and the input operation which are permitted through authentication from obtaining permission for authentication by repeating the input operation randomly. In this way, it is possible to improve the reliability of authentication.

Moreover, the procedure of the operations in the respective configurations of the display apparatus 100 can be realized as a program for causing a computer to execute the above-described processing and a computer-readable recording medium, and the processing is executed by a computer system reading and executing the program. Here, the "computer system" as used herein includes hardware such as a CPU, various kinds of memories, OS's, and peripherals.

Moreover, the "computer system" includes a homepage providing environment (or display environment) if it uses the WWW system.

Moreover, the "computer-readable recording medium" is a writable nonvolatile memory such as a flexible disk, an opto-magnetic disk, a ROM, or a flash memory, a portable medium such as a CD-ROM, and a storage device such as a hard disk included in a computer system.

Furthermore, the "computer-readable recording medium" includes one that stores programs for a predetermined period such as a volatile memory (for example, DRAM: Dynamic Random Access Memory) provided inside a computer system that serves as a server or a client when a program is transmitted through a network such as the Internet and a communication line such as a telephone line.

Moreover, the program may be transmitted from a computer system storing the program in a storage device or the like to another computer system through a transmission medium or through transmission waves in a transmission medium. Here, the "transmission medium" that transmits the program is a medium having a function of transmitting information, such as a network (communication network) such as the Internet and a communication line (communication wire) such as a telephone line.

Moreover, the program may realize a part of the above-described functions. Furthermore, the program may be a so-called differential file (differential program) which can realize the above-described functions through a combination with a program that is recorded in advance in a computer system.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display apparatus comprising:
an input section that inputs input information representing an input operation from an operation means contacting a touch screen, which includes a plurality of segmented areas, each of the segmented areas including an inner space that includes a plurality of positions defined by coordinates that further segment each of the segmented areas;
a display section that refers to an authentication table correlating the input operation with a display image so as to display the display image on the touch screen; and
an authentication processing section that refers to the authentication table so as to determine whether a combination of a display image displayed on the touch screen and an input operation represented by the input information input by the input section in a state where the display image is being displayed is correlated in the authentication table, and authenticates an input action by the input operation when the combination is correlated in the authentication table, wherein the authentication table includes a movement of the operation means on the touch screen, a contact area of the operation means on the touch screen, and a contact position of the operation means on the touch screen as the input operation, the authentication table further correlates at least three security levels, each security level representing different difficulty from that of other security levels on permitting authentication with the display screen and the input operation which are correlated with each other, the authentication processing section authenticates the input action based on one of the movement, the contact area and the contact position in a lowest security level, authenticates the input action based on the movement, the contact area and the contact position in a highest security level, and authenticates the input action based on two items of the movement, the contact area and the contact position in a middle security level between the lowest security level and the highest security level, and the authentication table further correlates the input operation with an image different from the displayed image.

2. The display apparatus according to claim 1, further comprising an image processing section that performs image processing representing the input operation on the display image displayed on the touch screen.

3. An authentication method comprising:
referring to an authentication table that correlates a display image with an input operation so as to display the display image on a touch screen;
inputting input information representing an input operation from an operation means contacting the touch screen, which includes a plurality of segmented areas including an inner space that includes a plurality of positions defined by coordinates that further segment each of the segmented areas; and
referring to the authentication table so as to determine whether a combination of a display image displayed on the touch screen and an input operation represented by the input information input by an input section in a state where the display image is being displayed is correlated in the authentication table, and authenticating an input action by the input operation when the combination is correlated in the authentication table,
wherein the authentication table includes a movement of the operation means on the touch screen, a contact area of the operation means on the touch screen, and a contact position of the operation means on the touch screen as the input operation,
the authentication table further correlates at least three security levels, each security level representing different difficulty from that of other security levels on permitting authentication with the display screen and the input operation which are correlated with each other,
at the authenticating, the input action is authenticated based on one of the movement, the contact area and the contact position in a lowest security level, the input action is authenticated based on the movement, the contact area and the contact position in a highest security level, and the input action is authenticated based on two items of the movement, the contact area and the contact position in a middle security level between the lowest security level and the highest security level, and
the authentication table further correlates the input operation with an image different from the displayed image.

4. A non-transitory computer readable medium storing executable instructions that when executed by a processor perform steps comprising:
referring to an authentication table that correlates a display image with an input operation so as to display the display image on a touch screen;
inputting input information representing an input operation from an operation means contacting the touch screen, which includes a plurality of segmented areas including an inner space that includes a plurality of positions defined by coordinates that further segment each of the segmented areas; and
referring to the authentication table so as to determine whether a combination of a display image displayed on the touch screen and an input operation represented by the input information input by an input section in a state where the display image is being displayed is correlated in the authentication table, and authenticating an input action by the input operation when the combination is correlated in the authentication table,
wherein the authentication table includes a movement of the operation means on the touch screen, a contact area of the operation means on the touch screen, and a contact position of the operation means on the touch screen as the input operation,
the authentication table further correlates at least three security levels, each security level representing different difficulty from that of other security levels on permitting authentication with the display screen and the input operation which are correlated with each other,
at the authenticating, the input action is authenticated based on one of the movement, the contact area and the contact position in a lowest security level, the input action is authenticated based on the movement, the contact area and the contact position in a highest security level, and the input action is authenticated based on two items of the movement, the contact area and the contact position in a middle security level between the lowest security level and the highest security level, and
the authentication table further correlates the input operation with an image different from the displayed image.

* * * * *

UNITED STATES PATENT AND TRADEMARK OFFICE
CERTIFICATE OF CORRECTION

PATENT NO.       : 8,997,211 B2
APPLICATION NO.  : 13/072274
DATED            : March 31, 2015
INVENTOR(S)      : Hiroaki Hirose It is certified that error appears in the above-identified patent and that said Letters Patent is hereby corrected as shown below:

On the title page, item (73) Assignee, please replace

"Japan Display West Inc., Aich-ken (JP)" with

--Japan Display Inc., Tokyo (JP)--.

Signed and Sealed this
Third Day of November, 2015

Michelle K. Lee
*Director of the United States Patent and Trademark Office*